United States Patent [19]

Rogakos et al.

[11] Patent Number: 4,924,726
[45] Date of Patent: May 15, 1990

[54] REVERSE TO PARK MECHANISM WITH SECURE LATCHING

[75] Inventors: Deno J. Rogakos, Centerville; Harry C. Buchanan, Jr., Spring Valley; Mark M. Benner, Xenia, all of Ohio

[73] Assignee: General Motors Corporation, Detroit, Mich.

[21] Appl. No.: 361,611

[22] Filed: Jun. 5, 1989

[51] Int. Cl.⁵ .............................. B60S 1/24; F16C 3/28
[52] U.S. Cl. ...................................... 74/600; 15/250.16
[58] Field of Search ........... 74/600; 15/250.16, 250.17

[56] References Cited

U.S. PATENT DOCUMENTS

| | | | |
|---|---|---|---|
| 2,717,518 | 9/1955 | Latta | 74/75 |
| 2,753,721 | 7/1956 | Latta | 74/75 |
| 3,253,206 | 5/1966 | Romanowski | 318/466 |
| 3,262,038 | 7/1965 | Smith | 318/265 |
| 3,665,772 | 5/1972 | Beard et al. | 74/75 |
| 3,716,887 | 2/1973 | Bellware | 15/250.17 |
| 3,942,385 | 9/1976 | Westerdale | 74/70 |
| 4,400,844 | 8/1988 | Hayakawa et al. | 15/250.16 |
| 4,454,626 | 6/1984 | Schmidt et al. | 15/250.16 |
| 4,559,845 | 12/1985 | Fallows | 74/600 |
| 4,597,129 | 7/1986 | Eustache et al. | 15/250.16 |
| 4,610,046 | 9/1986 | Buschur et al. | 15/250.16 |
| 4,729,144 | 3/1988 | Sahara et al. | 74/600 |
| 4,798,102 | 1/1989 | Buschur et al. | 74/600 |

*Primary Examiner*—Allan D. Herrmann
*Attorney, Agent, or Firm*—Patrick M. Griffin

[57] ABSTRACT

A reverse to park mechanism of the type in which a crank arm is eccentrically pivoted relative to a reversable drive shaft axis. The crank arm is held in a first position by a drive lug on one side of the crank arm that prevents it from pivoting in one direction, and a latching lever pivoted to the crank arm that engages a latching pin to prevent it from pivoting in the other direction. The orientation of a keeper surface of the latching lever relative to the cylindrical surface of the latching pin that it contacts is designed to provide a very strong resistance to slip off, while allowing a reversal activated torque means to easily move the keeper surface off of the latching pin to release the crank arm.

3 Claims, 5 Drawing Sheets

REVERSE TO PARK MECHANISM WITH SECURE LATCHING

This invention relates to windshield wiper park mechanisms generally, and specifically to such a mechanism of the type that is activated by reversal of the drive motor.

BACKGROUND OF THE INVENTION

Vehicle windshield wiper systems often stop the wipers, at the end of the wipe cycle, in a position that is lower than the normal inwipe position, generally called a depressed park position. The park mechanisms that provide for the depressed park position generally do so by selectively varying the effective length, although not the actual length, of one link in the linkage that drives the wipers. A different effective length for the variable link translates into a lower inwipe, or park, position for the wipers. The variable length link is typically the link that is directly attached to the motor drive shaft, generally called the crank arm. The effective length of the crank arm is varied by latching it in one fixed angular position relative to the drive shaft during the normal wipe cycle, then freeing it to shift eccentrically to a different angular position when it is desired to park the wipers, which gives a longer effective length. Such park mechanisms may be broadly categorized into two types. Each type needs some mechanism to lock the variable length link during normal wiping, and to then free it to park.

In the first general category of park mechanism, the motor is unidirectional. A latch mechanism fixes the variable link at one angular position until it is desired to end the wipe cycle and park the wipers. Then, a switch activates an external mover, such as a solenoid, to deactivate the latch mechanism and allow the variable link to eccentrically shift to another angular position as the motor continues to coast in the same direction. The inevitable drawback to such a system is the expense and complexity of providing the external mover.

In a second general category, the drive motor is bi directional, that is, reversible. A latch locks the variable link at one angular position during the regular wipe cycle, when the motor rotates in the forward direction. Reversing the drive motor acts to release the latch and allow the variable link to eccentrically shift to a different angular position and a longer effective length. The basic advantage of a reverse to park mechanism is that it is relatively easy and inexpensive to simply reverse the drive motor, compared to providing an external mover. A disadvantage is that, if the latch is designed to be very secure and positive during the normal wipe cycle, it is consequently difficult to release. Conversely, if the latch is made to be easily releasable in response to motor reversal, it is generally not very positive or secure during the regular wipe cycle. Known reverse to park mechanism latches include direction sensitive spring detents, torsional brake springs, one way clutches, simple tension springs, and lost motion pins and slots combined with return springs. None of these are generally as secure and positive as an externally moved latch. Furthermore, structures like direction sensitive spring detents, which depend on friction as a retention force, degrade significantly over time with wear.

SUMMARY OF THE INVENTION

The invention provides a novel reverse to park mechanism in which the latch, although dependent in part on friction, is highly positive and secure, while still being easily releasable when the drive motor is reversed.

In the preferred embodiment, a driving disk with upper and lower surfaces is fixed to the motor drive shaft. A vehicle mounted housing has an opening through which the motor shaft projects, and a seal that engages the disk. Therefore, any components located below the driving disk are protected by the sealed housing. A pivot shaft is journaled through the driving disk at a point offset from the drive shaft axis. A crank arm is fixed to the pivot shaft above the disk, and so is effectively pivoted at a main pivot point offset from the drive shaft axis. A stop means in the form of a driving lug on the upper surface of the driving disk hits the side of the crank arm when the drive shaft and driving disk rotate in the normal or forward direction. This constrains the crank arm from pivoting in the opposite or reverse direction. Other structure prevents the crank arm from pivoting in the forward direction.

A latching pin with a cylindrical outer surface is fixed to the disk lower surface and is spaced from the same side of the crank arm that the driving lug contacts. A guide lever is fixed to the main pivot shaft below the driving disk lower surface, and so rotates one to one with the crank arm. A generally hook shaped latching latching lever is pivoted to the guide lever at a secondary pivot pin. The latching lever has a substantially straight keeper surface on its outer end which, when the latching lever is in a latching position, engages the surface of the latching pin at a point of tangency offset from the top dead center point of the latching pin surface. The keeper surface is also oriented so as to form a shallow angle with a line normal to the point of tangency. The angle is small enough that the frictional force created between the keeper surface and pin surface is in turn sufficient to prevent the keeper surface from slipping off of the latching pin. Therefore, any forces tending to pivot the crank arm about the main pivot point in the forward direction relative to the driving disk are effectively resisted, and the crank arm is securely confined and retained in a fixed angular position relative to the driving disk, giving a first crank arm length or radius, as measured from the motor drive shaft axis.

In order to free the crank arm to move to a different effective radius when the motor is reversed, a torque means is provided that engages the latching lever only when the motor is reversed, and not when it runs in the forward direction. When the motor is reversed, the torque means applies a torque to the latching lever that acts to pivot it about the secondary pivot point, away from its latching position. So pivoting the latching lever moves the keeper surface off of the latching pin surface cleanly, by virtue of the location of the point of tangency. As the latching lever pivots, the crank arm is freed to pivot about the main pivot point to a greater effective radius. When the motor is run in the forward direction again, the latching lever moves back to the latching position and re engages the latching pin to re confine the crank arm.

It is, therefore, a general object of the invention to provide a reverse to park mechanism that provides a very secure, positive latch for an eccentrically shiftable crank arm, but which is also easily and cleanly released at reversal.

It is another object of the invention to provide such a park mechanism by confining a crank arm in one direction with a driving lug that contacts one side of the crank arm, while confining it in the other direction with a latching lever pivoted to the crank arm having a keeper surface that engages a latching pin in such a way as to give secure retention and easy release.

It is another object of the invention to provide such a park mechanism in which a substantially straight keeper surface of the latching lever contacts a cylindrical surface of the latching pin at a point offset from the top dead center point of the latching pin, so as to be easily releasable by a direction sensitive torque means, and in which the angle formed by the keeper surface with the latching pin surface at the point of tangency is shallow enough that the frictional force generated between the surfaces is in turn large enough to prevent the keeper surface from slipping off of the latching pin.

It is another object of the invention to provide a package in which the components are compactly arranged, easily sealed, and easily retrofitted to a reversible motor.

DESCRIPTION OF THE PREFERRED EMBODIMENT

These and other objects and features of the invention will appear from the following written description, and from the drawings, in which.

Figure 1:
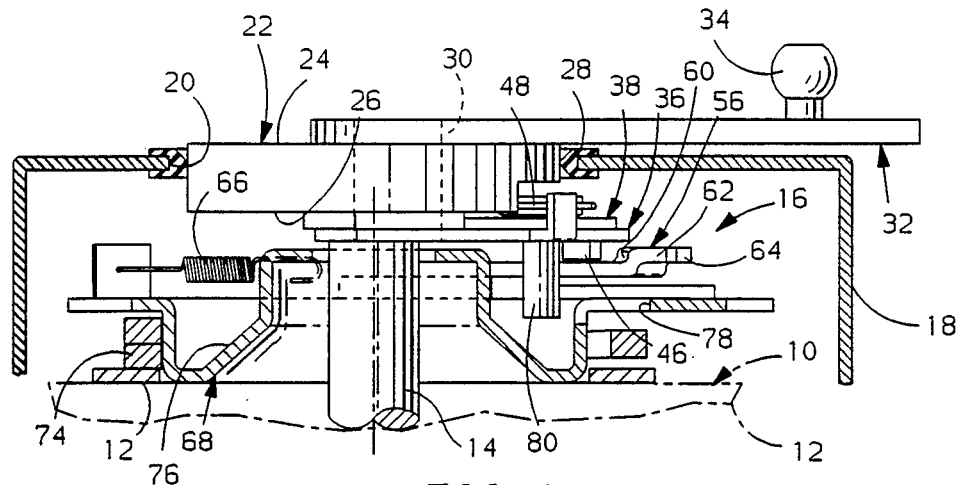
FIG. 1 is a side view showing a cross section of the top of a motor housing and an outer housing showing the preferred embodiment of the park mechanism of the invention in elevation.
Figure 2:
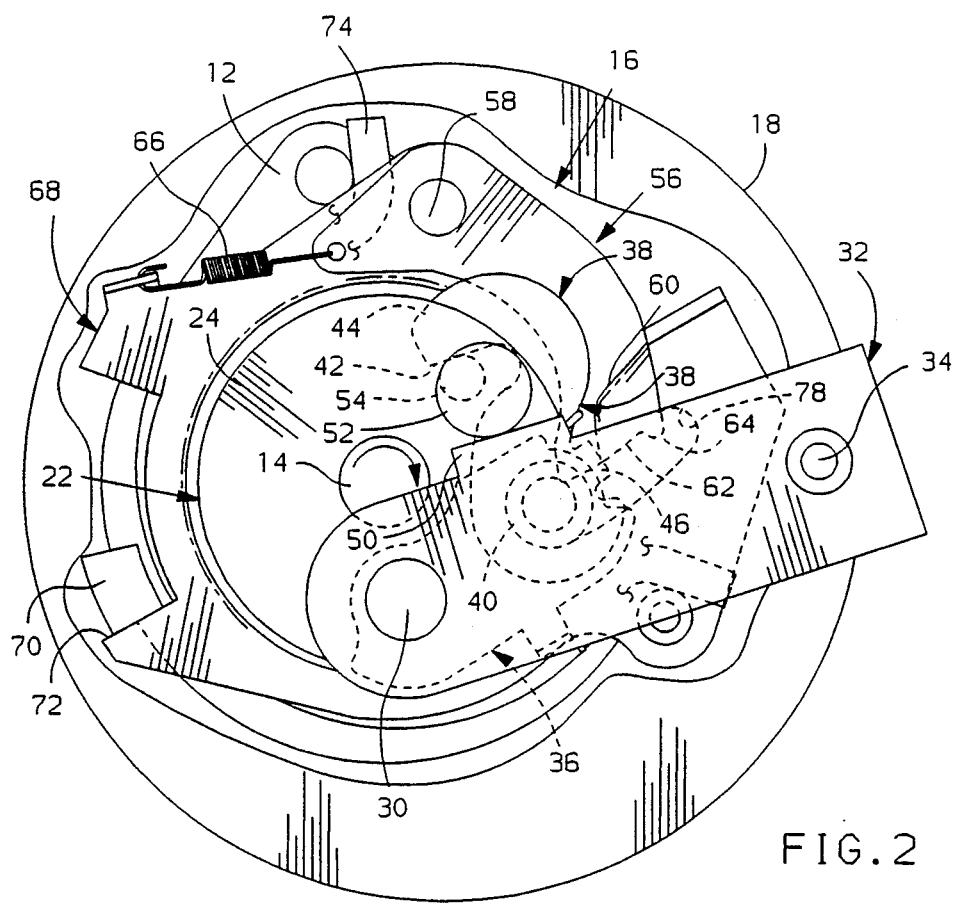
FIG. 2 is an top plan view showing the park mechanism without the outer housing, and showing the latched, normal running position.

Referring first to FIGS. 1 and 2, a vehicle is represented in abbreviated fashion by a motor, designated generally at 10 which has a housing 12 and a central drive shaft 14. Motor housing 12 and drive shaft 14 would be fixed to a conventional vehicle body, and thus represent the foundation, or ground reference frame, to which other components are mounted, and relative to which they move. Motor drive shaft 14 normally rotates in a forward direction about a central axis, shown by a dotted line in FIG. 1. The normal, forward, direction here happens to be clockwise, from the perspective of FIG. 2. Motor 10 is the type in which shaft 14 can also be reversed, which the operator would do simply with a conventional off switch and the attendant circuitry, which is not illustrated. A preferred embodiment of the reverse to park mechanism of the invention is designated generally at 16. A conventional wiper linkage and wiper would be driven by motor 10 through the park mechanism 16. These, too, need not be illustrated, as it is only the mechanical features of the park mechanism 16, and the improved way in which they releasably confine a crank arm, that need be described in order to understand and practice the invention. Park mechanism 16 is external to motor 10, meaning it is designed to be added over the top of any reversible motor, rather than being built into it, as is the case with many unidirectional systems. Although external to motor 10, park mechanism 16 is protected almost entirely by its own outer housing, indicated generally at 18, which has a central opening 20 coaxial to motor shaft 14. The various components of park mechanism 16, described next, are arranged so as to make it more easily protected by housing 18.

Referring still to FIGS. 1 and 2, a circular driving disk, indicated generally at 22, is a very solid construction of sintered metal. Disk 22 has upper and lower surfaces 24 and 26, and is fixed rigidly to the end of motor drive shaft 14 coaxially within housing opening 20. The side edge of driving disk 22 is engaged by a rubbing seal 28. A main pivot pin 30 is journaled completely through driving disk 22 at a point offset from the central axis of motor drive shaft 14, with an upper end above disk upper surface 24 and a lower end below disk lower surface 26. A crank arm, designated generally at 32, is fixed at its inner end to main pivot pin 30, above disk upper surface 24. Crank arm 32 has a ball joint 34 at its outer end, which would be joined to the wiper linkage. Pivot pin 30 provides a main pivot point about which crank arm 32 can eccentrically shift relative to the axis of motor shaft 14. If crank arm 32 is somehow constrained in a fixed angular position relative to driving disk 22, an effective radius or length will be created, as measured from the central axis of drive shaft 14 to the ball joint 34. That effective length would, in turn, determine a certain wipe pattern. The latching and release structure that allows crank arm 32 to be selectively confined at two different effective lengths will be next described.

Figure 3:
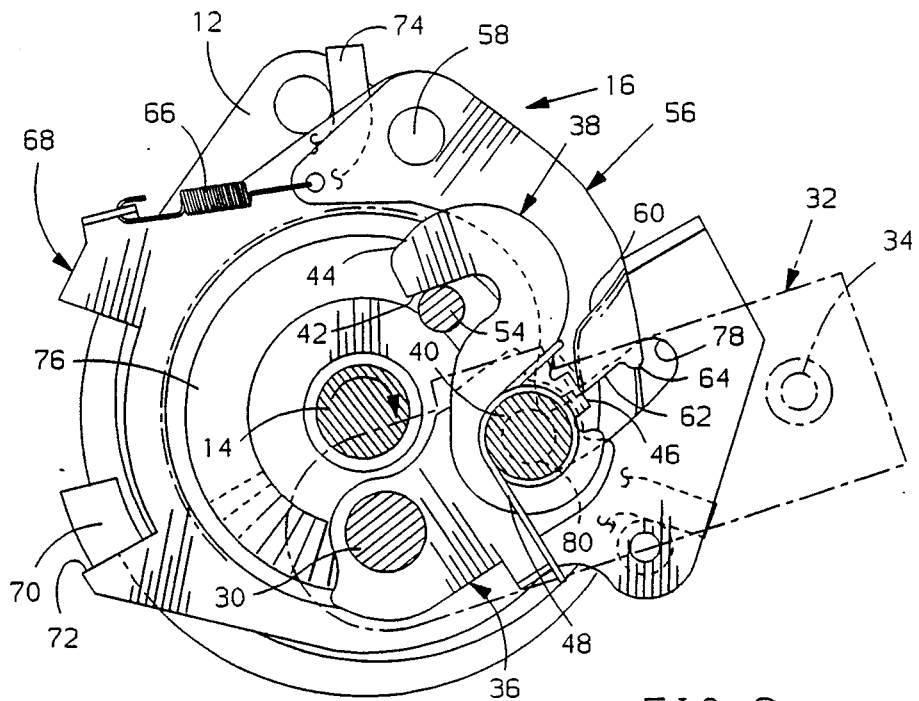
FIG. 3 is a view like FIG. 2, but with part of the upper structure removed and other structure shown in dotted lines to reveal lower structure.

Referring next to FIGS. 1, 2 and 3, a guide lever, designated generally at 36, is fixed to main pivot pin 30 and below disk lower surface 26, generally parallel to the crank arm 32 above it. Guide lever 36 pivots in lock step with crank arm 32 about main pivot pin 30 and serves, in effect, as an extension of crank arm 32 to which other structure may be conveniently mounted. As best seen in FIG. 3, a generally hook shaped latching lever, indicated generally at 38, is pivoted to guide lever 36 at a secondary pivot pin 40. The outer end of latching lever 38 comprises a keeper surface 42 below a curved striker surface 44. The shape of keeper surface 42 and its orientation to other structure to be described later is important to the operation of the invention. Here, keeper surface 42 is essentially straight, and extends generally normal to the latching lever 38. Depending from the inner end of latching lever 38 is a release tab 46 that is offset from the center line of secondary pivot pin 40. A torsion return spring 48, best seen in FIG. 3, is hooked between guide lever 36 and latching lever 38 to give latching lever 38 a continual rotational bias toward what may be termed a latched position. At the latched position, latching lever 38 is substantially perpendicular to crank arm 32, so that keeper surface 42 is substantially parallel to one side of crank arm 32, specifically to the edge of a projection 50 on the side or crank arm 32. A stop means in the form of a cylindrical driving lug 52 projects up from the drive disk upper surface 24. A cylindrical latching pin 54 projects down from drive disk lower surface 26, nearly coaxial with driving lug 52. Latching pin 54 is located on driving disk 22 is such a way that, when the crank arm projection 50 is against driving lug 52 and latching lever 38 is in the latched position, as in FIG. 2, then the surface of latching pin 54 just touches keeper surface 42. Since keeper surface 42 is essentially straight, the area of mutual contact will be essentially a point, or small area, of tangency. Stated differently, the keeper surface 42 does not wrap the surface of the latching pin 54. Since guide lever 36, latching lever 38, and latching pin 54 are all located below the disk lower surface 26, and since the side edge of disk 22 is sealed by seal 28, only the disk upper surface 24, driving lug 52, and crank arm 32 are exposed outside of housing 18. This is a great advantage, both for protection, and in allowing park mechanism 16 to be easily and practically retrofitted to the shaft of any reversible motor.

Figure 9:
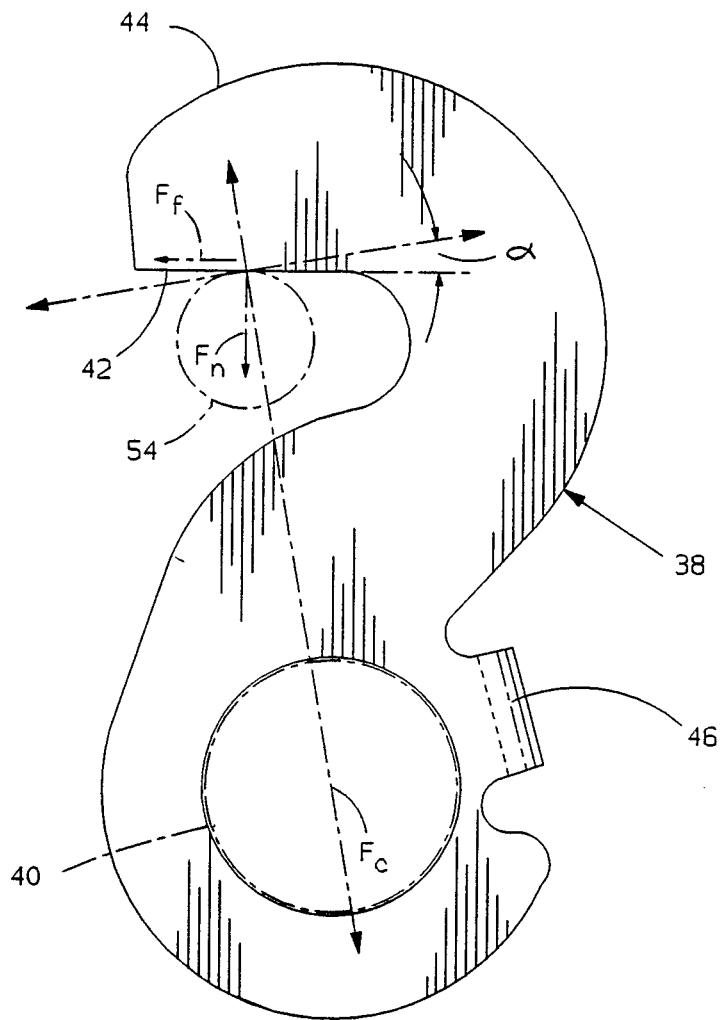
FIG. 9 is a free body diagram showing the various forces at work when the mechanism is fully latched.

Referring next to FIG. 9, it may be seen how the latching structure just described normally retains crank arm 32 in a first, fixed angular position relative to disk 22. When motor shaft 14 and driving disk 22 turn in the forward, clockwise direction, driving lug 52 will continually be pushed into the edge of crank arm side projection 50. As a consequence, crank arm 32 will be incapable of rotating about main pivot pin 30 in the reverse direction. At the same time, any force on crank arm 32 that would tend to pivot it in the forward direction about pin 30 will pull keeper surface 42 into the surface of latching pin 54. Specifically, such a force, indicated at Fc, would act along the dotted line running between the center of the secondary pivot pin 40 and the point of tangency between the surface of latching pin 54 and keeper surface 42. The line perpendicular line to the point of tangency, also shown by a dotted line, forms a small angle alpha with the keeper surface 42. In other words, the keeper surface 42 is not perfectly square to the line along which Fc acts. As a consequence, the force Fc will have a component acting to the right, that is, acting to pull keeper surface 42 off of latching pin 54, which component would have a magnitude of Fc×sin(alpha). While alpha, and hence sin(alpha) is small, Fc may be potentially large. Opposing that component of Fc is the frictional force, Ff, which would act to the left, acting to prevent keeper surface 42 from slipping off of latching pin 54. In addition, the force of the return spring 48 would help to retain keeper surface 42 onto latching pin 54, but that can be ignored for purposes of quantitative analysis. The magnitude of Ff is the coefficient of friction, mu, between the keeper surface 42 and the surface of latching pin 54 times the normal force, Fn, at the point of tangency. The magnitude of Fn, in turn, would be the other component of Fc, or Fc×cos(alpha). So, at a static condition, when the pull off force equals the retention force, Fc×sin(alpha) would equal mu×Fc×cos(alpha). This reduces to mu equal to Tan(alpha). In other words, as the angle alpha, and the value of its tangent, are made larger, a larger coefficient of friction would be necessary to prevent keeper surface 42 from slipping off of latching pin 54, and conversely. For the particular embodiment shown, alpha is around ten degrees, so a coefficient of friction of about 0.17 would be needed. This is well within what is available for a clean steel surface rubbing against another. So, the net effect is that crank arm 32 cannot pivot in either direction, and is very strongly and securely held. Of course, with an alpha of zero, that is, an orientation where keeper surface 42 is square to the line of force of Fc, the very strongest retention force would exist. However, the orientation shown is preferred for reasons described next.

Figure 4:
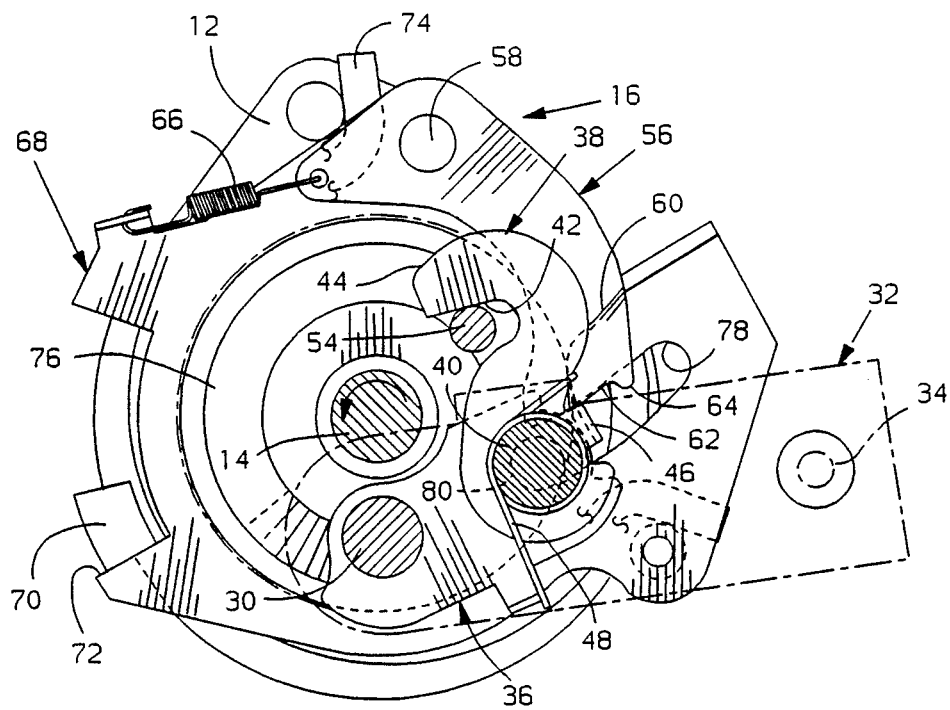
FIG. 4 is a view like FIG. 3, but showing the motor reversed and unlatching commencing.

Referring next to FIGS. 1 through 4, the aspects of the structure that give the other desirable feature, easy and clean release at reversal, is illustrated. A torque means is provided that creates a torque on latching lever 38 to pivot it away from latching position, that is, clockwise about secondary pivot pin 40, when shaft 14 is reversed. This frees crank arm 32 to move away from driving lug 52 to a new angular position, giving a longer effective crank arm radius or length, and a lower inwipe or park position. In the preferred embodiment disclosed, the torque means includes, in addition to the release tab 46 on latching lever 38 noted above, a bell crank shaped release lever, designated generally at 56. Release lever 56 is pivoted to the vehicle by being pivoted at pin 58 to motor housing 12. Actually, release lever 56 is indirectly pivoted to motor housing 12, in that it is pivoted to other structure, described below, which provides another feature. Release lever 56 has several operative surfaces at its front end, including a raised slip surface 60, which has a shallow slope relative to the perimeter of disk 22, and a blocking surface 62 below slip surface 60, which has a steep slope relative to the perimeter of disk 22. A stop lip 64 sits at the end of blocking surface 62. A tension return spring hooked to the other end of release lever 56 gives it a continual rotational bias radially inwardly about pin 58 to an operative position. The operative position of release lever 56 is shown in FIG. 4, although FIG. 4 shows motor 10 running in reverse. At the operative position of release lever 56, slip surface 60 rests at a smaller radius relative to the axis of drive shaft 14 than latching lever release tab 46. As a consequence, when shaft 14 and disk 22 run in the forward direction, release tab 46 contacts and slides past the raised slip surface 60, but misses, the lower blocking surface 62, which kicks release lever 56 out with every rotation. This is shown occurring in FIGS. 2 and 3. When release tab 46 has moved completely past slip surface 60, release lever 56 will move back automatically to the operative position of FIG. 4. So, there is no effect upon latching lever 38 when shaft 14 runs in the forward direction, and crank 32 remains securely locked in place.

Figure 5:
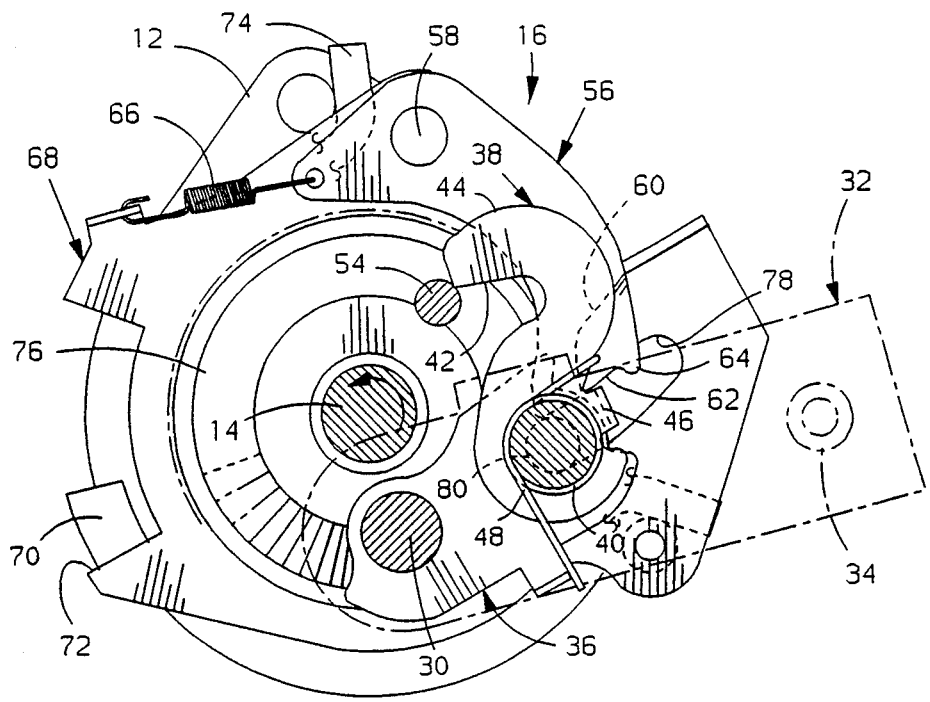
FIG. 5 is a view like FIG. 4, showing the unlatching process farther along.
Figure 6:
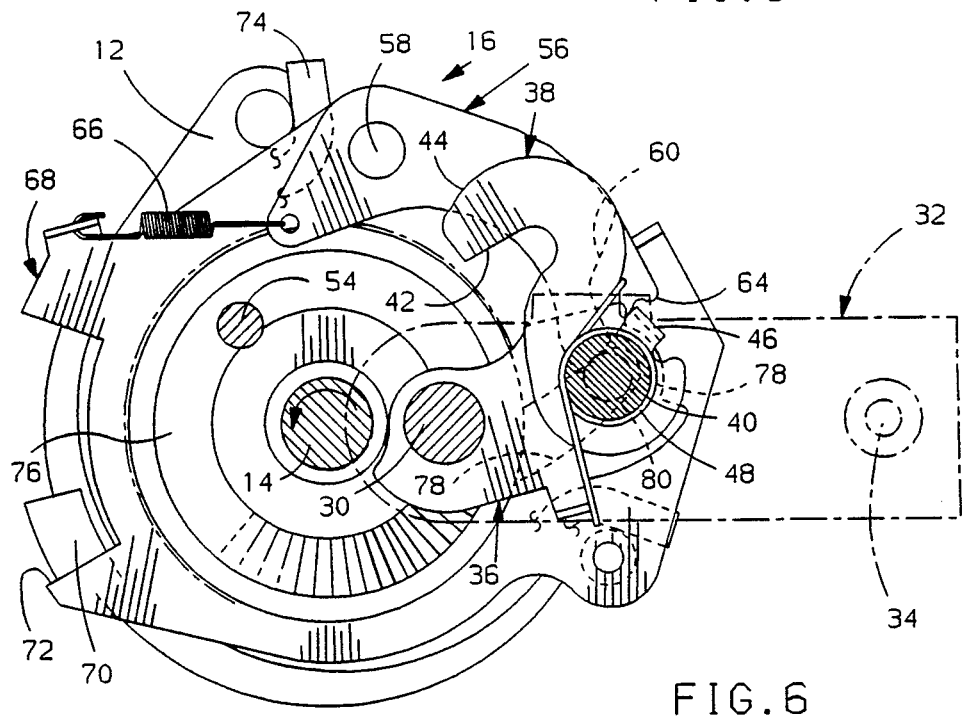
FIG. 6 shows the fully parked position.
Figure 7:
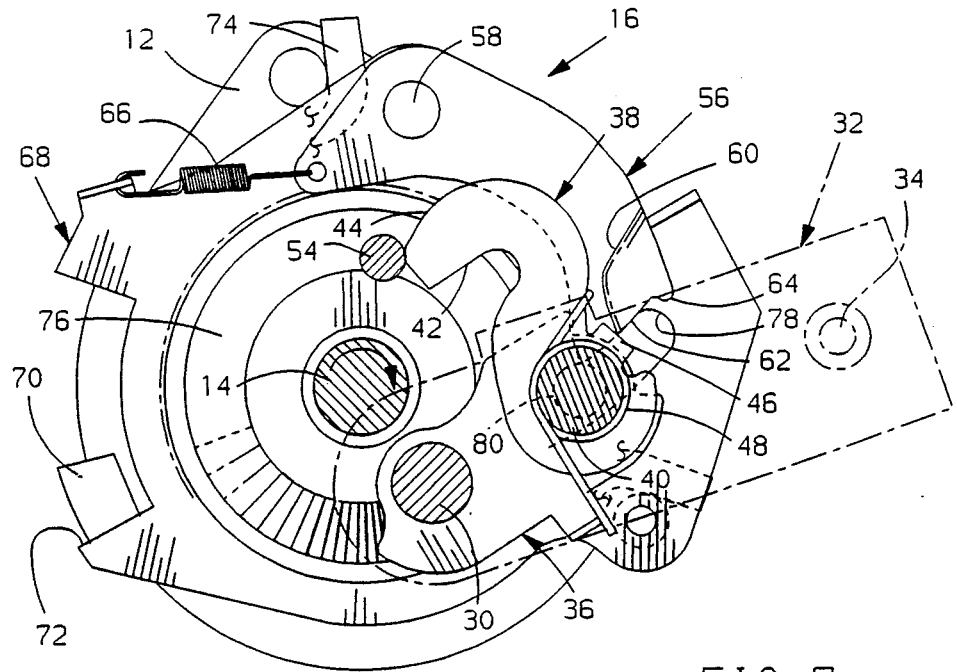
FIG. 7 shows the return from park, with the motor rotating in the forward direction again and the latch beginning to re-latch.

Referring next to FIGS. 4 through 7, when the motor shaft 14 is reversed to run counterclockwise, latching lever release tab 46 will eventually hit release lever blocking surface 62, before it has a chance to hit the slip surface 60. This is shown just occurring in FIG. 4. Continued rotation of shaft 14 in the reverse direction will, therefore, cause release lever lever 56 to push on release tab 46, which creates a torque on latching lever 38 about the axis of the secondary pivot pin 40. Latching lever 38 will thereby be pivoted in the counterclockwise direction, away from the latching position, as is shown occurring in FIG. 5. Release tab 46 may slide along blocking surface 62 to an extent as unlatching occurs, which can be seen to have happened if FIGS. 4 and 5 are compared, but the stop lip 64 will prevent release tab 46 from leaving blocking surface 62. Eventually, as disk 22 continues to rotate in reverse, latching pin 54 will move away from latching lever 38 completely, which will return to its original position under the rotational bias of return spring 48. As a result, crank arm 32 is free to pivot clockwise about the main pin 30, away from driving lug 52, shifting eccentrically relative to the axis of motor drive shaft 14. When crank arm 32 reaches the FIG. 6 park position, where ball joint 34, main pivot pin 30 and drive shaft 14 are basically aligned, conventional circuitry and sensors, not illustrated, would stop the rotation of motor drive shaft 14. This defines the fully parked position, where the wipers would be moved to a lower inwipe position by virtue of the longer effective length of crank arm 30. When motor drive shaft 14 is again run in the forward, clockwise direction, the force on crank arm 32 from the non illustrated wiper linkage acts to pivot crank arm 32 back counterclockwise about secondary pivot pin 40 as latching pin 54 moves back toward latching lever 38. Eventually, as shown in FIG. 7, striker surface 44 hits latching pin 54, which kicks latching lever 38 out far enough to let latching pin 54 back under keeper surface 42. The return spring 48 moves latching lever 38 back to its latching position just as crank arm projection 50 moves back against driving lug 52, and the crank arm 32 is thereafter re-latched into its first position.

Referring to FIG. 9, the features that assure that latching lever 38 is freely and cleanly releasable from latching pin 54 are illustrated. It will be recalled that keeper surface 42 is deliberately oriented so as to not be perfectly square to the line of force of Fc. Because of the shallow angle alpha, the contact point of tangency of the outer surface of latching pin 54 with keeper surface 42 is not at the 12 o'clock, top dead center point of the surface of latching pin 54, referred to as TDC. Instead, the contact point is at something more like the 1 o'clock position. Stated differently, the line of force along which Fc acts does not pass through the center of latching pin 54, but to the right of it. As a consequence, when the torque is applied to latching lever 38 by the release lever 56, the keeper surface 42 can move cleanly and immediately away from the outer surface of the latching pin 54, with essentially no interference or resistance. The pivoting of latching lever 38 about pivot pin 40, therefore, also is without substantial resistance. There would be interference if the point of contact were on the other side of top dead center, at the 11 o'clock position, for example, more so at the 10 o'clock position, and so on. If there were wear over time between the keeper surface 42 and the latching pin 54, this would be taken up by the return spring 48 moving the latching lever 38 continually to a latching position with a shallower angle alpha. Although small, angle alpha is made sufficient to assure that while the point or area of mutual contact would move somewhat closer to TDC over time, it would remain offset to the same side of TDC as release tab 46, so the clean release feature would remain. Furthermore, with a wear induced decrease in the shallow angle alpha over time, the frictional retention force described above would only become greater in magnitude. So, the very desirable condition is created where wear will not decrease the ease of latch release, and will even increase latch security. Performance of any mechanical mechanism would not normally be expected even to remain the same with wear over time, let alone improve in any sense.

Referring next to FIGS. 1, 5, 6, additional structure provides other features and advantages, in cooperation with the parking mechanism 16. A stamped steel cup, indicated generally at 68, is journaled to motor housing 12, within outer housing 18, so that it can twist back and forth, within limits, coaxially to motor drive shaft 14. Those limits are set by a stop block 70 on motor housing 12 that fits within an arcuate cutout 72 on the edge of cup 68. A strong torsion spring 74 hooked between cup 68 and motor housing 12 gives cup 68 a very strong clockwise rotational bias, pushing stop block 70 against the lower edge of cutout 72. So, normally, cup 68 is effectively fixed relative to motor housing 12. It is to cup 68 that release lever 56 is directly pivoted, and so, under normal conditions, release lever 56 operates as if it were directly pivoted to motor housing 12 and vehicle 10. Cup 68 has a central annular trough 76 from which a curved slot 78 extends at a location bordering the release lever blocking surface 62. In addition, depending from the secondary pivot pin 40 is a coaxial, smaller diameter guide pin 80. When disk 22 rotates normally in the forward, clockwise direction, guide pin 80 rides in trough 76, which provides a redundant guard against crank arm 32 moving out of position. As the mechanism moves into park position, guide pin 80 moves into slot 78 as release tab 46 concurrently slides along release lever blocking surface 62. Slot 78 lets guide pin 80 move out of trough 76 so that the park position can be achieved. Slot 78 also provides guidance to pin 80, and thus to guide lever 36 and crank arm 32, to help assure that they move along the proper path, both out and back. Comparing FIGS. 5 and 6 shows how guide pin moves back and forth in cup slot 78.

Figure 8:
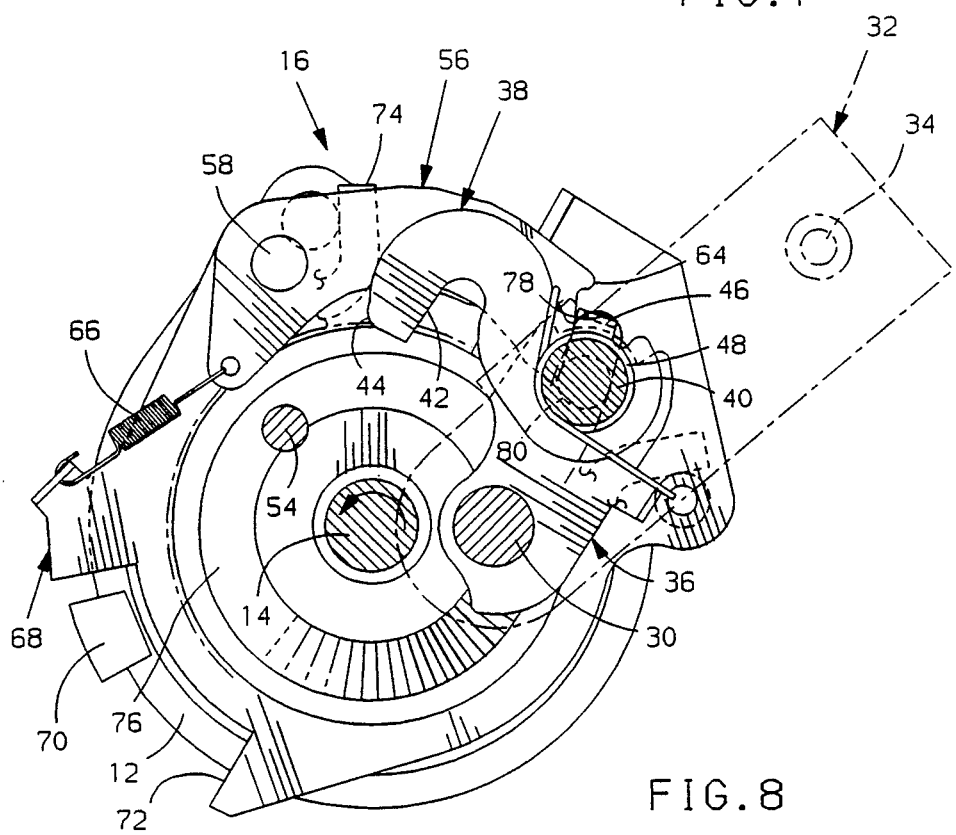
FIG. 8 shows the response of the park mechanism to an obstruction that prevents the full park position from being attained.

Referring to FIG. 8, another important feature provided by cup 68 is illustrated. In moving to park, the wipers may encounter an obstruction, such as a snow build up. That puts a strong back force on crank arm 32 that resists its pivoting clockwise about main pivot pin 30. In that case, a strong back force would be applied as well to guide lever 36 and thence to release tab 46, which would push in a counterclockwise direction on release lever 56. The back force can be a very strong, because of the great mechanical advantage built into most wiper linkages. If this occurs, cup 68, to which release lever 56 is pinned at 58, cup 68, to which release lever 56 is pivoted, can twist counterclockwise relative to motor housing 12 as torsion spring 74 winds up, and as stop block 70 moves away from the lower edge of cup cutout 72. Thus, although guide pin 80 stays in slot 78, crank arm 32 is not forced to move to the full park position, protecting the components from over stress.

Variations of the preferred embodiment maybe made within the broad confines of the invention. Conceivably, for example, the latching lever could be pivoted directly to the crank arm 32, rather than to a separate guide lever 36. Basic operation would be the same, since the guide lever 36 moves in lock step with the crank arm 32. Nor is a drive disk 22 as such necessary, so long as the main pivot point 30 for the crank arm 32 is somehow provided. However, the use of the guide lever 36 below the solid, circular disk 22 makes for a more compact and easily sealed system, which is a great advantage in retrofitting. Any direction sensitive torque means could be used to apply a disconnecting torque to latching lever 38 upon the reversal of motor 10. The release lever 56 and release tab 46 shown are not only relatively simple, however, but are also robust enough to efficiently transmit the snow load back force from crank arm 32 to cup 68. The basic orientation of keeper surface 42 described in detail above is important to ease of operation, but the keeper surface 42 need not be perfectly straight, so long as it retains the basic orientation. In fact, a shallow curvature could be given to the keeper surface 42, generated with a radius equal to the distance between the axis of secondary pivot pin 40 to the point of tangency, but with the center point of generation of the shallow curve being offset to that side of secondary pivot pin 40 opposite to release tab 46. The point of tangency would still be offset from the TDC point, so release would still be clean, and the effective angle alpha would still be shallow. But, any wear of the latching pin 54 into the keeper surface 42 would not create a localized dent in the keeper surface 42. Therefore, it will be understood that it is not intended to limit the invention to just the preferred embodiment disclosed.

The embodiments of the invention in which an exclusive property or privilege is claimed are defined as follows:

1. A reverse to park mechanism for use with a vehicle mounted wiper motor having a drive shaft that is normally rotated in a forward direction about a central axis, but which can be reversed, said mechanism comprising, a crank arm pivoted relative to said drive shaft at a main pivot point offset from said drive shaft central axis, stop means engageable between said drive shaft and one side of said crank arm when said drive shaft rotates in the forward direction, thereby preventing said crank arm from pivoting about said main pivot point in the reverse direction, a latching pin with a generally cylindrical surface fixed relative to said drive shaft at a location spaced from the same side of said crank arm engaged by said stop means, a latching lever pivoted to said crank arm at a secondary pivot point and having a generally straight keeper surface which, when said latching lever is in a latching position and said crank arm is engaged with said stop means, contacts the surface of said latching pin at a point of tangency offset from the top dead center point of said latching pin surface and in an orientation such that the angle formed by said keeper surface with a line normal to said point of tangency is sufficiently shallow that the mutual frictional force created is in turn sufficient to prevent said keeper surface from slipping off of said latching pin surface, whereby said crank arm is also prevented from pivoting about said main pivot point in the forward direction, and is thereby completely confined, in cooperation with said stop means, in a fixed angular position relative to said drive shaft central axis with a first effective crank arm radius, and, a torque means engageable with said latching lever only when said drive shaft rotates in the reverse direction so as to pivot said latching lever about said secondary pivot point away from said latching position and move said keeper surface freely away from said latching pin surface, by virtue of the location of said point of tangency, thereby freeing said crank arm to rotate about said main pivot point in the forward direction to a second effective crank arm radius.

2. A reverse to park mechanism for use with a vehicle mounted wiper motor having a drive shaft that is normally rotated in a forward direction about a central axis, but which can be reversed, said mechanism comprising, a driving disk fixed to said drive shaft so as to rotate therewith and having an upper surface and a lower surface, a main pivot pin extending completely through said driving disk at a point offset from said drive shaft central axis, a crank arm fixed to said main pivot pin above said driving disk upper surface, a driving lug on said driving disk upper surface engageable with a side of said crank arm when said drive shaft and driving disk rotate in the forward direction, thereby preventing said crank arm from pivoting relative to said driving disk on said main pivot pin in the reverse direction, a latching pin with a generally cylindrical surface fixed to said driving disk lower surface at a location spaced from the same side of said crank arm engaged by said driving lug, a guide lever fixed to said main pivot pin below said driving disk lower surface, a latching lever pivoted at a secondary pivot pin to said guide lever below said driving disk lower surface and having a generally straight keeper surface which, when said latching lever is in a latching position and said crank arm is engaged with said driving lug, contacts the surface of said latching pin at a point of tangency offset from the top dead center point of said latching pin surface and in an orientation such that the angle formed by said keeper surface with a line normal to said point of tangency is sufficiently shallow that the mutual frictional force created is in turn sufficient to prevent said keeper surface from slipping off of said latching pin surface, whereby said crank arm is also prevented from pivoting about said main pivot pin in the forward direction, and is thereby, completely confined, in cooperation with said driving lug, in a fixed angular position relative to said drive shaft central axis with a first effective crank arm radius, a torque means located below said driving disk lower surface and engageable with said latching lever only when said drive shaft rotates in the reverse direction so as to pivot said latching lever about said secondary pivot pin away from said latching position and move said keeper surface freely away from said latching pin surface, by virtue of the location of said point of tangency, thereby freeing said crank arm to rotate about said main pivot pin in the forward direction to a second effective crank arm radius, and, an outer housing sealed against said driving disk, whereby only said crank arm and driving lug are exposed outside of said housing.

3. A reverse to park mechanism for use with a vehicle mounted wiper motor having a drive shaft that is normally rotated in a forward direction about a central axis, but which can be reversed, said mechanism comprising, a crank arm pivoted relative to said drive shaft at a main pivot point offset from said drive shaft central axis, stop means engageable between said drive shaft and one side of said crank arm when said drive shaft rotates in the forward direction, thereby preventing said crank arm from pivoting about said main pivot point in the reverse direction, a latching pin with a generally cylindrical surface fixed relative to said drive shaft at a location spaced from the same side of said crank arm engaged by said stop means, a latching lever pivoted to said crank arm at a secondary pivot point and having a generally straight keeper surface which, when said latching lever is in a latching position and said crank arm is engaged with said stop means, contacts the surface of said latching pin at a point of tangency offset from the top dead center point of said latching pin surface and in an orientation such that the angle formed by said keeper surface with a line normal to said point of tangency is sufficiently shallow that the mutual frictional force created is in turn sufficient to prevent said keeper surface from slipping off of said latching pin surface, whereby said crank arm is also prevented from pivoting about said main pivot point in the forward direction, and is thereby completely confined, in cooperation with said stop means, in a fixed angular position relative to said drive shaft central axis with a first effective crank arm radius, a release tab on said latching lever offset from said secondary pivot point, and, a release lever pivoted to said vehicle so as to be continually rotationally biased to an operative position, said release lever having a slipping surface past which said latching lever release tab slides as said drive shaft rotates in the forward direction, and a blocking surface against which said latching lever release tab is stopped when said drive shaft rotates in the reverse direction, thereby pivoting said latching lever about said secondary pivot point away from said latching position and moving said keeper surface freely away from said latching pin surface, by virtue of the location of said point of tangency, thereby freeing said crank arm to rotate about said main pivot point in the forward direction to a second effective crank arm radius.

* * * * *